US012656486B2

(12) United States Patent
Liu et al.

(10) Patent No.: US 12,656,486 B2
(45) Date of Patent: Jun. 16, 2026

(54) VEHICLE-MOUNTED RADAR SYSTEM, BLIND SPOT DETECTION METHOD AND VEHICLE

(71) Applicants: Beijing BOE Technology Development Co., Ltd., Beijing (CN); BOE Technology Group Co., Ltd., Beijing (CN)

(72) Inventors: Zongmin Liu, Beijing (CN); Feng Qu, Beijing (CN); Jijing Huang, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 160 days.

(21) Appl. No.: 18/622,794

(22) Filed: Mar. 29, 2024

(65) Prior Publication Data

US 2025/0076493 A1     Mar. 6, 2025

Related U.S. Application Data

(63) Continuation of application No. PCT/CN2023/116290, filed on Aug. 31, 2023.

(51) Int. Cl.
*G01S 13/931* (2020.01)
*B60Q 9/00* (2006.01)
(Continued)

(52) U.S. Cl.
CPC ............ *G01S 13/931* (2013.01); *G01S 7/032* (2013.01); *B60Q 9/00* (2013.01);
(Continued)

(58) Field of Classification Search
CPC .. G01S 13/931; G01S 7/032; G01S 2013/932; G01S 2013/9315;
(Continued)

(56) References Cited

U.S. PATENT DOCUMENTS

| 6,172,642 B1 | 1/2001 | DiDomenico et al. |
| 9,274,222 B1 | 3/2016 | Schmalenberg et al. |

(Continued)

FOREIGN PATENT DOCUMENTS

| CN | 104067142 A | 9/2014 |
| CN | 107106400 A | 8/2017 |

(Continued)

*Primary Examiner* — Sisay Yacob
(74) *Attorney, Agent, or Firm* — IPro, PLLC

(57) ABSTRACT

A vehicle-mounted radar system, a blind spot detection method and a vehicle are disclosed. The vehicle-mounted radar system includes an antenna array, a phase shifter array and a radar chip. The phase shifter array includes transmitting phase shifters and receiving phase shifters, the transmitting phase shifters are connected with corresponding transmitting antennas, the receiving phase shifters are connected with corresponding receiving antennas, the transmitting phase shifters are configured to adjust a beam direction of electromagnetic waves according to a driving condition of a vehicle so that the electromagnetic waves are transmitted to an actual blind spot, and the receiving phase shifters are configured to adjust a beam direction of echo signals so that the beam direction of the echo signals is same as the beam direction of the electromagnetic waves; the radar chip is connected with the transmitting phase shifters and the receiving phase shifters respectively.

13 Claims, 14 Drawing Sheets

(51) Int. Cl.
    *G01S 7/03*         (2006.01)
    *G01S 13/02*       (2006.01)

(52) U.S. Cl.
    CPC ................. *G01S 2013/0263* (2013.01); *G01S 2013/9315* (2020.01); *G01S 2013/932* (2020.01); *G01S 2013/93274* (2020.01); *G01S 2013/93275* (2020.01)

(58) Field of Classification Search
    CPC . G01S 2013/93275; G01S 2013/93274; G01S 2013/0263; G01S 2013/0245; B60Q 9/00
    See application file for complete search history.

(56)                References Cited

U.S. PATENT DOCUMENTS

| | | | |
|---|---|---|---|
| 2013/0088393 A1* | 4/2013 | Lee .......................... | G01S 7/354 |
| | | | 342/372 |
| 2013/0214961 A1* | 8/2013 | Lee .......................... | H01Q 3/26 |
| | | | 342/368 |
| 2016/0033640 A1 | 2/2016 | De Mersseman et al. | |
| 2019/0154824 A1* | 5/2019 | Bilik ....................... | G01S 7/411 |

FOREIGN PATENT DOCUMENTS

| | | | | |
|---|---|---|---|---|
| CN | 108169724 A | 6/2018 | | |
| CN | 108919271 A | 11/2018 | | |
| CN | 109799505 A | 5/2019 | | |
| CN | 112219133 A | 1/2021 | | |
| CN | 113799796 A | 12/2021 | | |
| KR | 20200006666 A | 1/2020 | | |
| WO | WO-2020021812 A1 * | 1/2020 | ............. | G01S 13/93 |

* cited by examiner

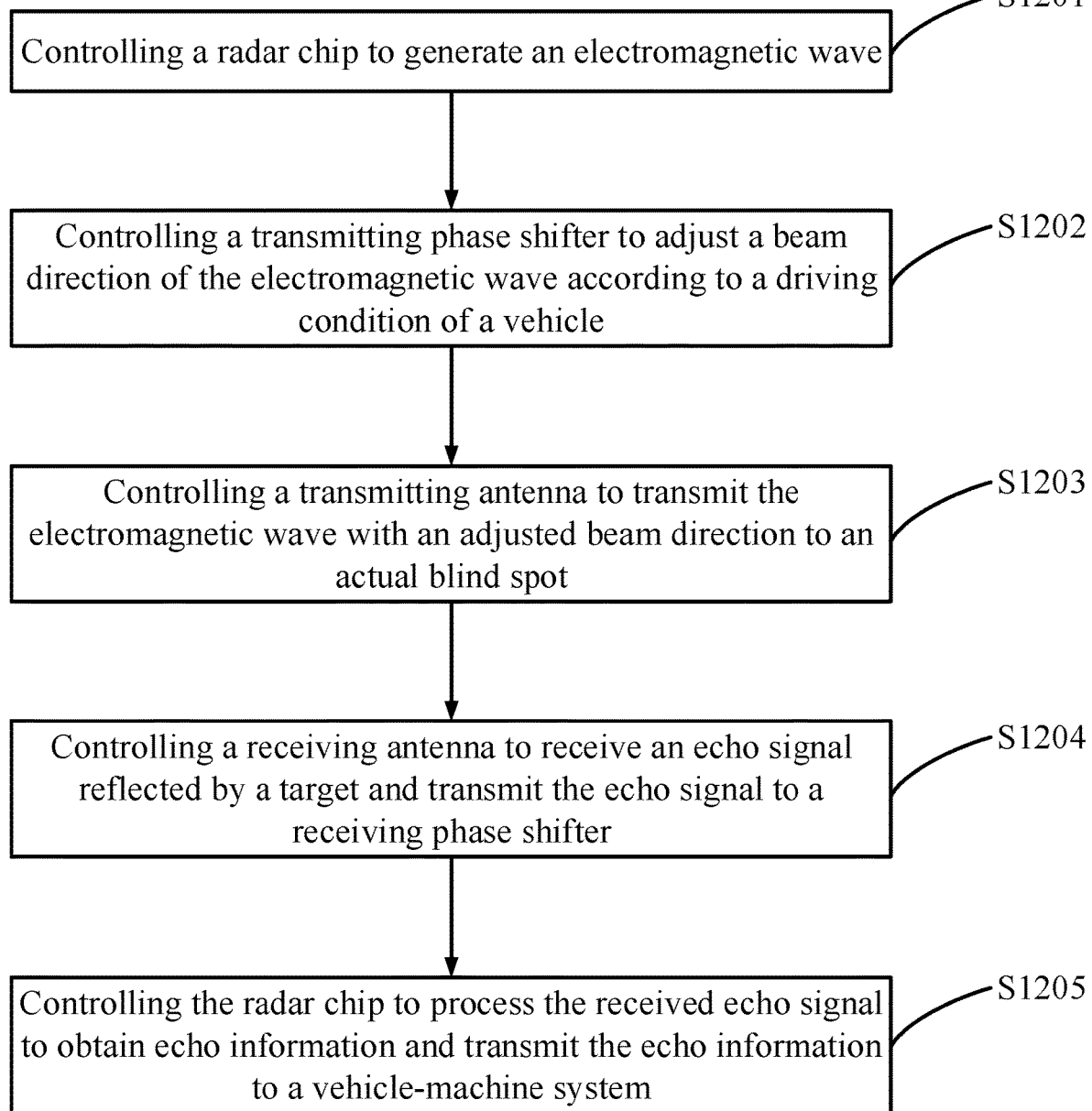

S1201

Controlling a radar chip to generate an electromagnetic wave

S1202

Controlling a transmitting phase shifter to adjust a beam direction of the electromagnetic wave according to a driving condition of a vehicle

S1203

Controlling a transmitting antenna to transmit the electromagnetic wave with an adjusted beam direction to an actual blind spot

S1204

Controlling a receiving antenna to receive an echo signal reflected by a target and transmit the echo signal to a receiving phase shifter

S1205

Controlling the radar chip to process the received echo signal to obtain echo information and transmit the echo information to a vehicle-machine system

FIG. 12

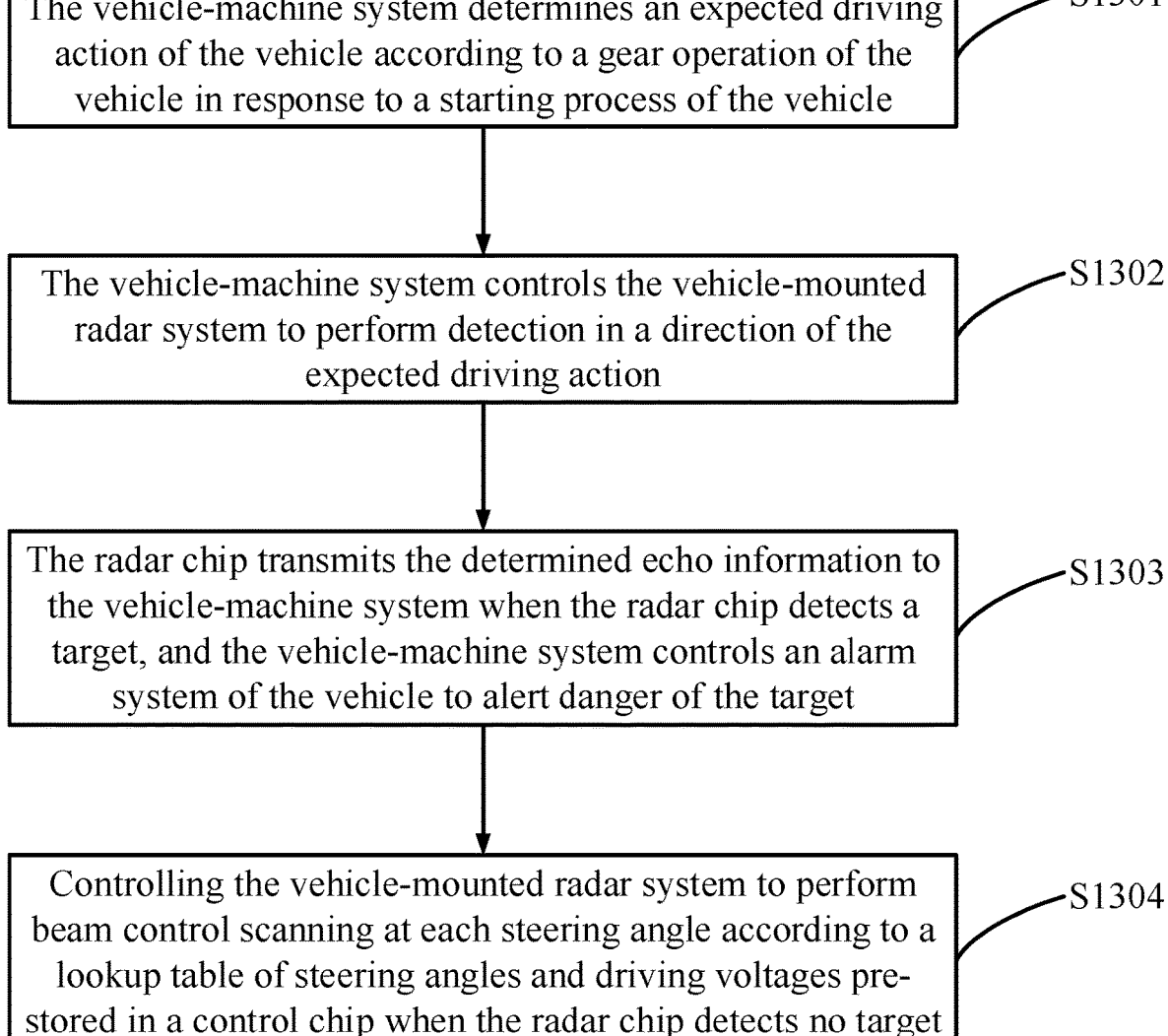

The vehicle-machine system determines an expected driving action of the vehicle according to a gear operation of the vehicle in response to a starting process of the vehicle — S1301

The vehicle-machine system controls the vehicle-mounted radar system to perform detection in a direction of the expected driving action — S1302

The radar chip transmits the determined echo information to the vehicle-machine system when the radar chip detects a target, and the vehicle-machine system controls an alarm system of the vehicle to alert danger of the target — S1303

Controlling the vehicle-mounted radar system to perform beam control scanning at each steering angle according to a lookup table of steering angles and driving voltages pre-stored in a control chip when the radar chip detects no target — S1304

FIG. 13

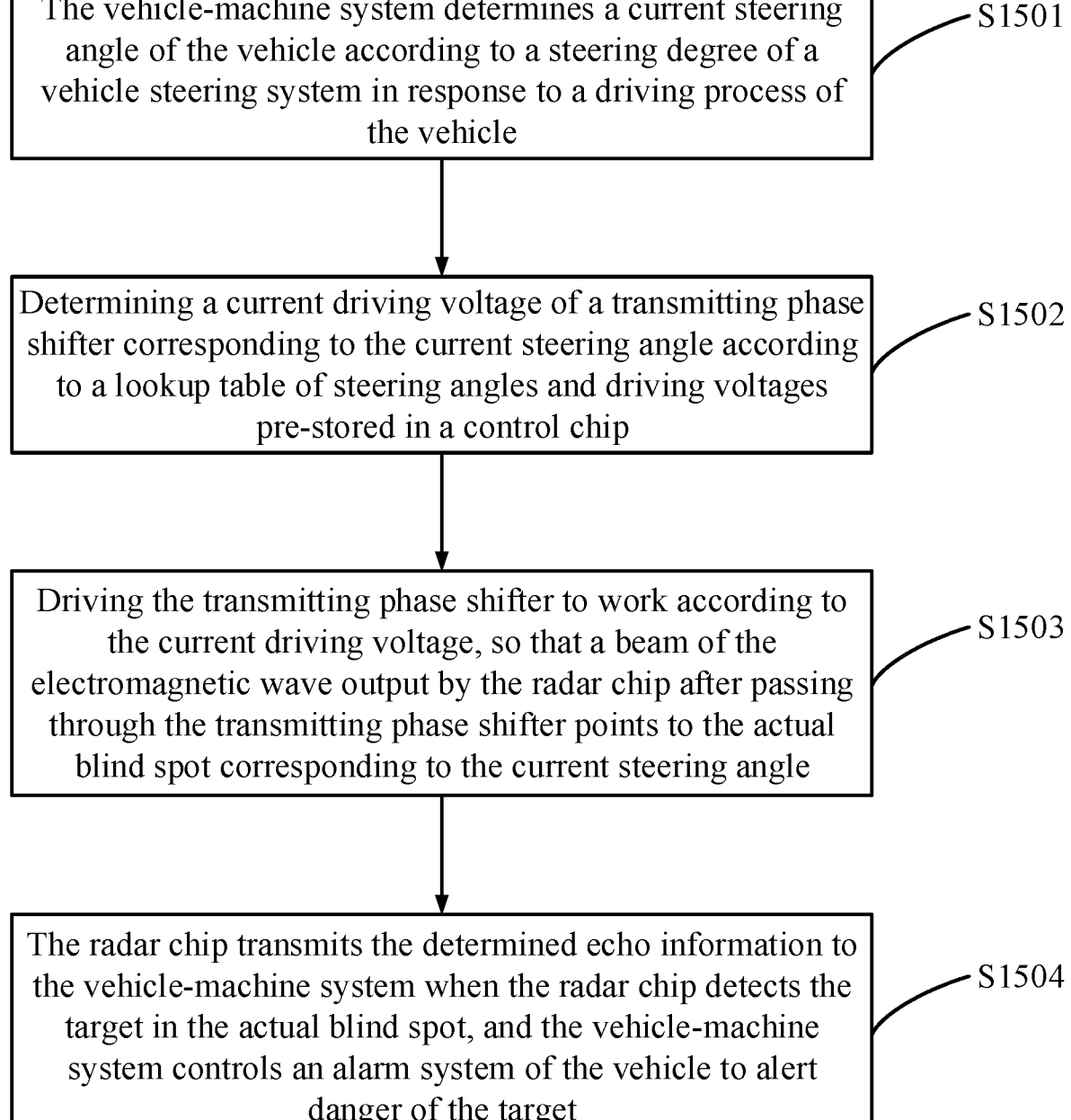

The vehicle-machine system determines a current steering angle of the vehicle according to a steering degree of a vehicle steering system in response to a driving process of the vehicle — S1501

Determining a current driving voltage of a transmitting phase shifter corresponding to the current steering angle according to a lookup table of steering angles and driving voltages pre-stored in a control chip — S1502

Driving the transmitting phase shifter to work according to the current driving voltage, so that a beam of the electromagnetic wave output by the radar chip after passing through the transmitting phase shifter points to the actual blind spot corresponding to the current steering angle — S1503

The radar chip transmits the determined echo information to the vehicle-machine system when the radar chip detects the target in the actual blind spot, and the vehicle-machine system controls an alarm system of the vehicle to alert danger of the target — S1504

FIG. 15

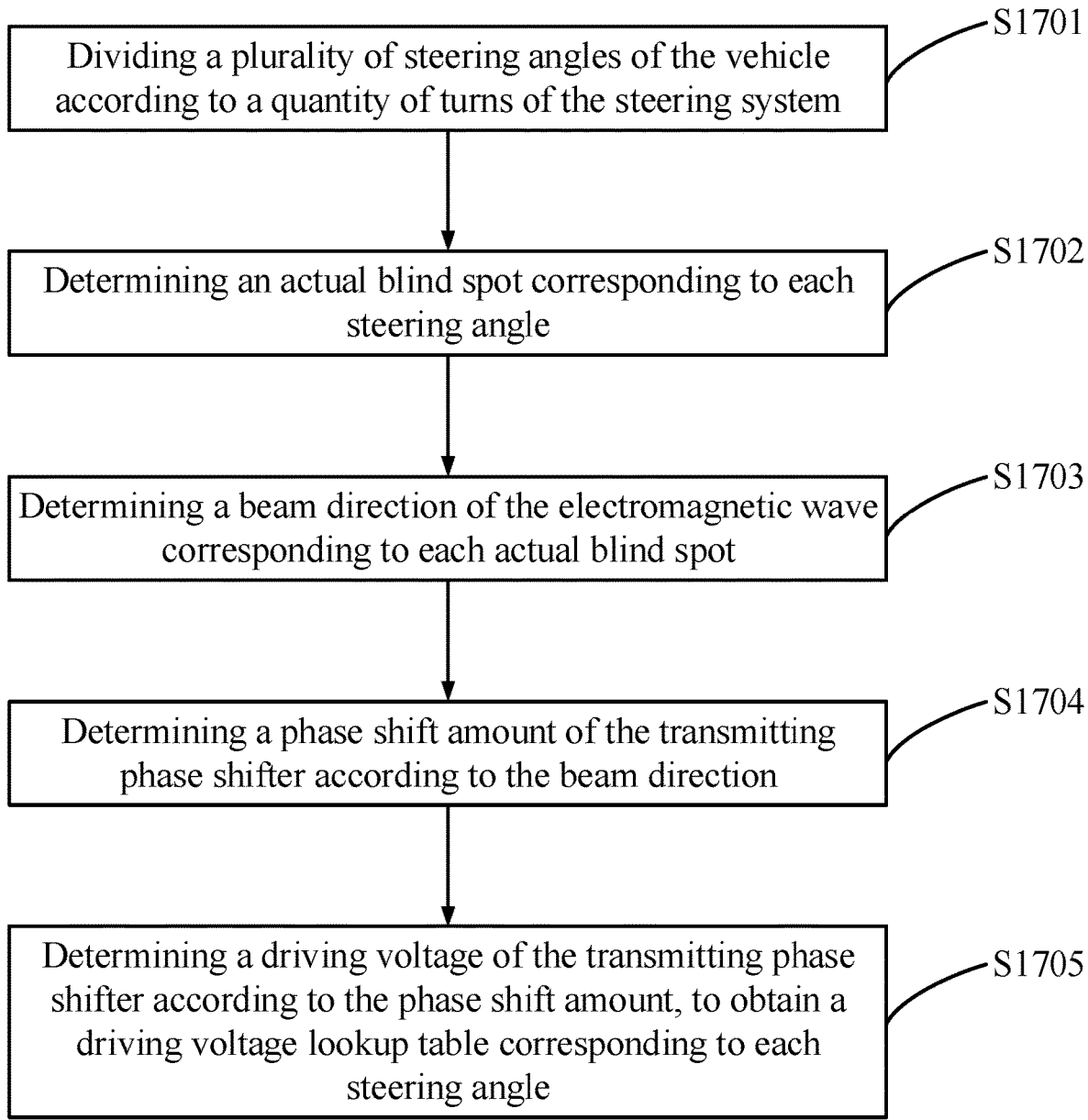

Dividing a plurality of steering angles of the vehicle according to a quantity of turns of the steering system — S1701

Determining an actual blind spot corresponding to each steering angle — S1702

Determining a beam direction of the electromagnetic wave corresponding to each actual blind spot — S1703

Determining a phase shift amount of the transmitting phase shifter according to the beam direction — S1704

Determining a driving voltage of the transmitting phase shifter according to the phase shift amount, to obtain a driving voltage lookup table corresponding to each steering angle — S1705

FIG. 17

VEHICLE-MOUNTED RADAR SYSTEM, BLIND SPOT DETECTION METHOD AND VEHICLE

CROSS-REFERENCE TO RELATED APPLICATIONS

This application is a continuation application of International Application No. PCT/CN2023/116290, filed on Aug. 31, 2023, which is hereby incorporated by reference in its entirety.

TECHNICAL FIELD

The disclosure relates to the field of radar detection technology, and in particular to a vehicle-mounted radar system, a blind spot detection method and a vehicle.

BACKGROUND

With the progress of society, the demand for vehicles continues to increase. People's understanding of vehicles no longer remains as a simple means of transportation, and people are increasingly pursuing the comfort and intelligence brought by technological progress. The blind spot monitoring radar is a relatively mature technology that uses radar to send and receive signals for ranging, helps a driver monitor blind spots during driving, and reminds the driver in a timely manner or forces the vehicle to perform risk avoidance operations.

SUMMARY

Embodiments of the disclosure provide a vehicle-mounted radar system, a blind spot detection method and a vehicle. The specific solutions are as follows.

An embodiment of the disclosure provides a vehicle-mounted radar system, including:

an antenna array including a plurality of transmitting antennas and a plurality of receiving antennas, where the transmitting antennas are configured to transmit electromagnetic waves, the receiving antennas are configured to receive echo signals, and the echo signals are signals of the electromagnetic waves reflected back from a target;

a phase shifter array including a plurality of transmitting phase shifters and a plurality of receiving phase shifters, where the transmitting phase shifters are connected with corresponding transmitting antennas, the receiving phase shifters are connected with corresponding receiving antennas, the transmitting phase shifters are configured to adjust a beam direction of the electromagnetic waves according to a driving condition of a vehicle so that the electromagnetic waves are transmitted to an actual blind spot, and the receiving phase shifters are configured to adjust a beam direction of the echo signals so that the beam direction of the echo signals is same as the beam direction of the electromagnetic waves; and a data processing unit including a radar chip, where the radar chip is connected with the transmitting phase shifters and the receiving phase shifters respectively, and the radar chip is configured to generate the electromagnetic waves, process the received echo signals to obtain echo information, and transmit the echo information to a vehicle-machine system.

Optionally, during specific implementation, in the above vehicle-mounted radar system according to an embodiment of the disclosure, the data processing unit further includes a control chip, the control chip is connected with the transmitting phase shifters and the receiving phase shifters respectively, and the control chip is configured to adjust phase shift amounts of the transmitting phase shifters and the receiving phase shifters according to the driving condition of the vehicle obtained from the vehicle-machine system.

Optionally, during specific implementation, in the above vehicle-mounted radar system according to an embodiment of the disclosure, structures of the transmitting phase shifters and structures of the receiving phase shifters are liquid crystal phase shifters, two-dimensional electronic bandgap phase shifters, resonant ring phase shifters or MEMS phase shifters.

Optionally, during specific implementation, in the above vehicle-mounted radar system according to an embodiment of the disclosure, the transmitting antennas are connected with the transmitting phase shifters in a one-to-one correspondence, and the receiving antennas are connected with the receiving phase shifters in a one-to-one correspondence.

Optionally, during specific implementation, in the above vehicle-mounted radar system according to an embodiment of the disclosure, the plurality of transmitting antennas are connected with a same transmitting phase shifter, and the plurality of receiving antennas are connected with a same receiving phase shifter.

Optionally, during specific implementation, in the above vehicle-mounted radar system according to an embodiment of the disclosure, the radar chip includes a microwave circuit and a digital processing circuit; where:

the microwave circuit includes a waveform generator, a signal separator, a power amplifier, a low noise amplifier, a mixer, an intermediate frequency amplifier and an analog-to-digital converter, where the waveform generator, the signal separator and the power amplifier are connected in sequence; the low noise amplifier, the mixer, the intermediate frequency amplifier, the analog-to-digital converter and the digital processing circuit are connected in sequence; and the signal separator is connected with the mixer; and the digital processing circuit includes one-dimensional Fourier transform, two-dimensional Fourier transform, peak search, constant false alarm rate and angle calculation.

Correspondingly, an embodiment of the disclosure further provides a vehicle, including a carriage body, and the above vehicle-mounted radar system according to embodiments of the disclosure mounted on the carriage body.

Optionally, during specific implementation, in the above vehicle according to an embodiment of the disclosure, the vehicle-mounted radar system is mounted at a center position of a front bumper, a center position of a rear bumper, and bottom positions of two B-pillars of the carriage body.

Optionally, during specific implementation, the above vehicle according to an embodiment of the disclosure further includes a vehicle-machine system, a steering system and an alarm system, where the vehicle-machine system is connected with a radar chip and a control chip, the steering system is connected with the vehicle-machine system, and the alarm system is connected with the vehicle-machine system.

Correspondingly, an embodiment of the disclosure further provides a blind spot detection method for a vehicle-mounted radar system, including:

controlling a radar chip to generate an electromagnetic wave;

controlling a transmitting phase shifter to adjust a beam direction of the electromagnetic wave according to a driving condition of a vehicle;

controlling a transmitting antenna to transmit the electromagnetic wave with an adjusted beam direction to an actual blind spot;

controlling a receiving antenna to receive an echo signal reflected by a target and transmit the echo signal to a receiving phase shifter; and controlling the radar chip to process the received echo signal to obtain echo information and transmit the echo information to a vehicle-machine system.

Optionally, during specific implementation, the above blind spot detection method according to an embodiment of the disclosure further includes:

determining, by the vehicle-machine system, a current steering angle of the vehicle according to a steering degree of a vehicle steering system in response to a driving process of the vehicle;

determining a current driving voltage of the transmitting phase shifter corresponding to the current steering angle according to a lookup table of steering angles and driving voltages pre-stored in a control chip;

driving the transmitting phase shifter to work according to the current driving voltage, so that a beam of the electromagnetic wave output by the radar chip after passing through the transmitting phase shifter points to the actual blind spot corresponding to the current steering angle; and transmitting, by the radar chip, the determined echo information to the vehicle-machine system when the radar chip detects the target in the actual blind spot; and controlling, by the vehicle-machine system, an alarm system of the vehicle to alert danger of the target.

Optionally, during specific implementation, the above blind spot detection method according to an embodiment of the disclosure further includes:

determining, by the vehicle-machine system, an expected driving action of the vehicle according to a gear operation of the vehicle in response to a starting process of the vehicle;

controlling, by the vehicle-machine system, the vehicle-mounted radar system to perform detection in a direction of the expected driving action;

transmitting, by the radar chip, the determined echo information to the vehicle-machine system when the radar chip detects the target; and controlling, by the vehicle-machine system, an alarm system of the vehicle to alert danger of the target; and controlling the vehicle-mounted radar system to perform beam control scanning at each steering angle according to a lookup table of steering angles and driving voltages pre-stored in a control chip when the radar chip detects no target.

Optionally, during specific implementation, in the above blind spot detection method according to an embodiment of the disclosure, the lookup table of steering angles and driving voltages is obtained by:

dividing a plurality of steering angles of the vehicle according to a quantity of turns of the steering system;

determining an actual blind spot corresponding to each steering angle;

determining a beam direction of the electromagnetic wave corresponding to each actual blind spot;

determining a phase shift amount of the transmitting phase shifter according to the beam direction; and determining a driving voltage of the transmitting phase shifter according to the phase shift amount, to obtain a driving voltage lookup table corresponding to each steering angle.

Optionally, during specific implementation, in the above blind spot detection method according to an embodiment of the disclosure, the echo information includes a distance, a relative speed and orientation information between the target and the vehicle.

Optionally, during specific implementation, the above blind spot detection method according to an embodiment of the disclosure further includes: controlling the vehicle-mounted radar system mounted at a center position of a front bumper and a center position of a rear bumper to start detection of the actual blind spot and determine whether there is a target in the actual blind spot in response to a straight-line driving process of the vehicle.

BRIEF DESCRIPTION OF FIGURES

FIG. 12 is a schematic flowchart of a blind spot detection method for a vehicle-mounted radar system according to an embodiment of the disclosure.

FIG. 13 is a schematic flowchart of another blind spot detection method for a vehicle-mounted radar system according to an embodiment of the disclosure.

FIG. 15 is a schematic flowchart of another blind spot detection method for a vehicle-mounted radar system according to an embodiment of the disclosure.

FIG. 17 is a schematic flowchart of another blind spot detection method for a vehicle-mounted radar system according to an embodiment of the disclosure.

DETAILED DESCRIPTION

Figure 1:
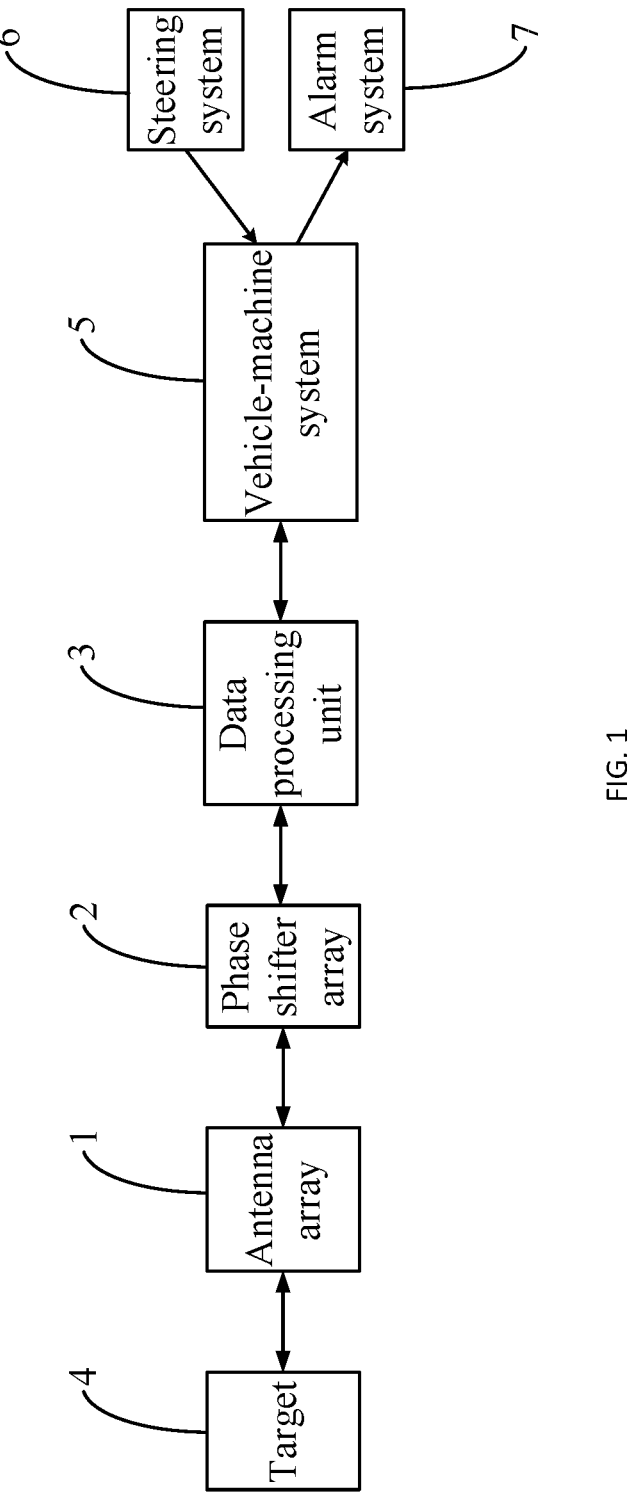
FIG. 1 is a schematic structural diagram of a vehicle-mounted radar system according to an embodiment of the disclosure.

In order to make purposes, technical solutions and advantages of the disclosure clearer, technical solutions of embodiments of the disclosure will be described clearly and completely below in combination with the accompanying drawings of embodiments of the disclosure. Obviously the described embodiments are a part of embodiments of the disclosure but not all embodiments. Also in the case of no conflict, embodiments and the features therein in the disclosure can be combined with each other. Based upon embodiments of the disclosure, all of other embodiments obtained by those ordinary skilled in the art without creative work pertain to the protection scope of the disclosure.

Unless otherwise defined, the technical or scientific terms used in the disclosure shall have the general meaning understood by those ordinary skilled in the art to which the disclosure belongs. The word such as "include" or "comprise" or the like used in the disclosure means that the element or object appearing before this word encompasses the elements or objects and their equivalents listed after this word, without excluding other elements or objects. The word such as "connect" or "connected" or the like is not limited to the physical or mechanical connection, but can include the electrical connection, whether direct or indirect. The words such as "inner", "outer", "up", "down" are only used to represent the relative position relationship. When the absolute position of a described object changes, the relative position relationship may also change accordingly.

It is necessary to note that the size and shape of each diagram in the accompanying drawings do not reflect the true proportion, and are merely for purpose of schematically illustrating the content of the disclosure. Also, the same or similar reference numbers represent the same or similar elements or the elements having the same or similar functions all the way.

With the progress of society, the demand for vehicles continues to increase. People's understanding of vehicles no longer remains as a simple means of transportation, and people are increasingly pursuing the comfort and intelligence brought by technological progress. The blind spot monitoring radar is a relatively mature technology that uses radar to send and receive signals for ranging, helps a driver monitor blind spots during driving, and reminds the driver in a timely manner or forces the vehicle to perform risk avoidance operations.

Although there are currently many implementations of the automotive radar system for blind spot monitoring, t implementations are mainly based on space division coverage of cooperation of a plurality of radars, that is, each radar is responsible for a specific area, and the radar coverage is fixed. Generally, a dual-radar or triple-radar structure is used, and the radars are respectively installed on the left and right sides or the left, middle and right sides of the rear of the vehicle. This kind of blind spot/distance monitoring by increasing the quantity of radars has the disadvantages of high cost and difficulty in installation, and also has the disadvantages that the monitoring area and the carriage body are relatively fixed so that the dynamic and flexible monitoring cannot be performed according to the driving state of the vehicle. For example, when the vehicle is in a special driving condition such as turning, the blind spot of the field of view will change. At this time, the radar is not monitoring the real blind spot.

Figure 2:
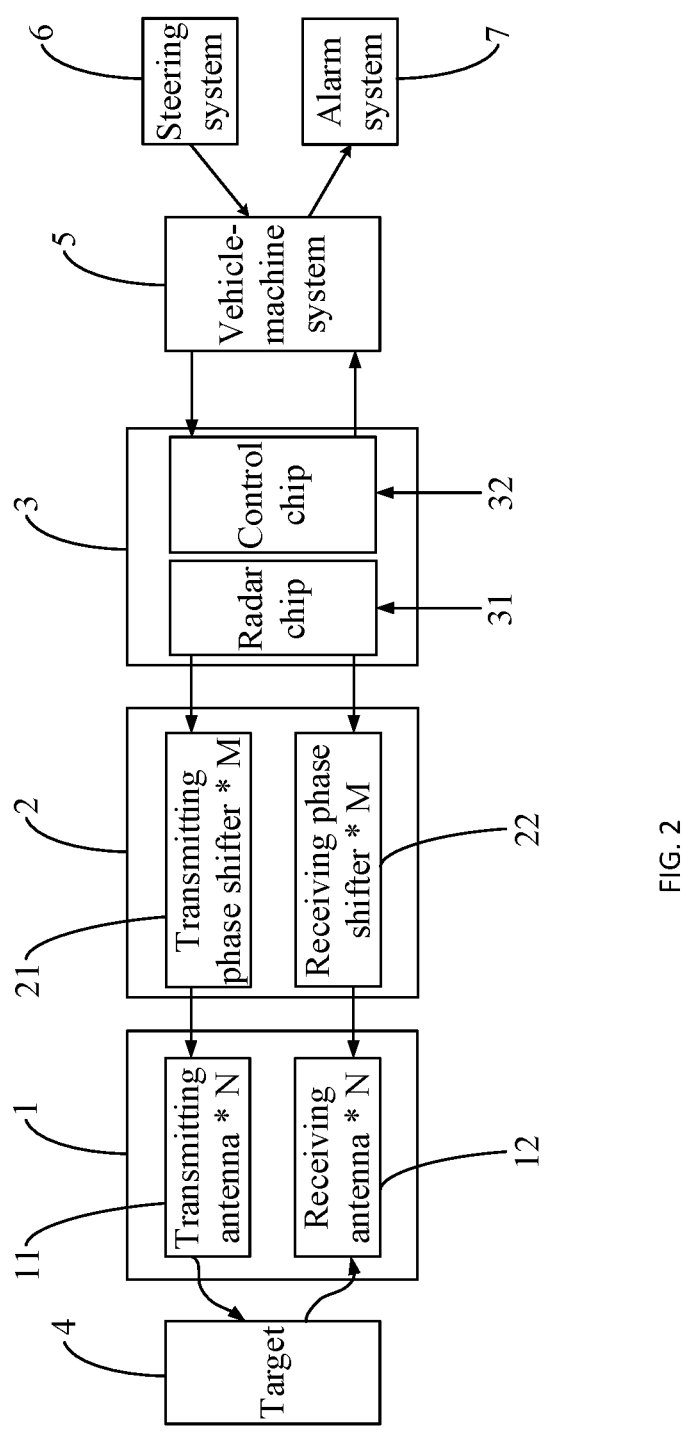
FIG. 2 is a schematic structural diagram of another vehicle-mounted radar system according to an embodiment of the disclosure.

In view of this case, an embodiment of the disclosure provides a vehicle-mounted radar system, as shown in FIGS. 1 and 2, including:

an antenna array 1 including a plurality of transmitting antennas 11 (taking N as an example) and a plurality of receiving antennas 12 (taking N as an example), where the transmitting antennas 11 are configured to transmit electromagnetic waves, the receiving antennas 12 are configured to receive echo signals, and the echo signals are signals of the electromagnetic waves reflected back from a target 4;

a phase shifter array 2 including a plurality of transmitting phase shifters 21 (taking M as an example) and a plurality of receiving phase shifters 22 (taking M as an example), where the transmitting phase shifters 21 are connected with corresponding transmitting antennas 11, the receiving phase shifters 22 are connected with corresponding receiving antennas 12, the transmitting phase shifters 21 are configured to adjust a beam direction of the electromagnetic waves according to a driving condition of a vehicle so that the electromagnetic waves are transmitted to an actual blind spot, and the receiving phase shifters 22 are configured to adjust a beam direction of the echo signals so that the beam direction of the echo signals is same as the beam direction of the electromagnetic waves; and a data processing unit 3 including a radar chip 31, where the radar chip 31 is connected with the transmitting phase shifters 21 and the receiving phase shifters 22 respectively, and the radar chip 31 is configured to generate the electromagnetic waves, process the received echo signals to obtain echo information, and transmit the echo information to a vehicle-machine system 5.

In the above vehicle-mounted radar system according to an embodiment of the disclosure, the phase shifter array is added between the antenna array and the data processing unit. When the driving condition of the vehicle changes to cause a change in the blind spot position, the beam direction of the electromagnetic waves can be ultimately changed by adjusting the phase shift amount of the phase shifter array, so that the electromagnetic waves are emitted to the actual blind spot. If the target (obstacle) is detected in the actual blind spot, the electromagnetic waves may be emitted and reflected back by the target, obtained by the receiving antennas and processed by the radar chip, and the echo information may be fed back to the vehicle-machine system for the warning or intervention operation. Therefore, the disclosure can monitor the blind spot of the vehicle, and can dynamically adjust the radar monitoring area according to the real-time state of the vehicle in cooperation with the vehicle-machine system, truly realizing blind spot monitoring under all vehicle conditions.

Optionally, in an embodiment of the disclosure, the electromagnetic waves generated by the radar chip are linear frequency-modulated continuous wave signals, and for example, may be millimeter-waveband electromagnetic waves. The radar system using the millimeter waveband can distinguish and identify very small targets, can identify a plurality of targets at the same time, and has the advantages of strong detection ability and small volume. Of course, the electromagnetic waves generated by the radar chip may also be electromagnetic waves in other bands in embodiments of the disclosure.

During specific implementation, in the above vehicle-mounted radar system according to an embodiment of the disclosure, as shown in FIGS. 1 and 2, the data processing unit 3 further includes a control chip 32, the control chip 32 is connected with the transmitting phase shifters 21 and the receiving phase shifters 22 respectively, and the control chip 32 is configured to adjust phase shift amounts of the transmitting phase shifters 21 and the receiving phase shifters 22 according to the driving condition of the vehicle obtained from the vehicle-machine system 5. The vehicle-machine system 5 is no longer a simple response terminal, but interacts with the data processing unit 3 through information and commands. When the vehicle is traveling normally (such as in a straight line), the beam direction of the electromagnetic wave is set in the conventional blind spot (diagonally ahead, diagonally behind) that the driver cannot see. At this time, the effect of the radar system according to an embodiment of the disclosure is similar to the effect of the traditional radar system. When the vehicle is in a special driving condition (such as turning), the driver's attention is still focused on the front of the vehicle, but the blind spot has become the side of the vehicle. The vehicle-machine system 5 may determine the driving state of the vehicle according to the degree of steering of the steering system 6 (steering wheel) and feedback the driving state to the control chip 32, and the control chip 32 controls and adjusts the phase shift amount of the phase shifter array 2, and ultimately changes the beam direction of the electromagnetic wave to the side of the vehicle, truly realizing blind spot monitoring under all vehicle conditions.

During specific implementation, in the above vehicle-mounted radar system according to an embodiment of the disclosure, as shown in FIGS. 1 and 2, the antenna array 1 is generally in the form of a microstrip patch, and the number N of transmitting antennas 11 or receiving antennas 12 can be comprehensively considered according to the detection distance and beam width, to achieve the ideal beam coverage.

Figure 3:
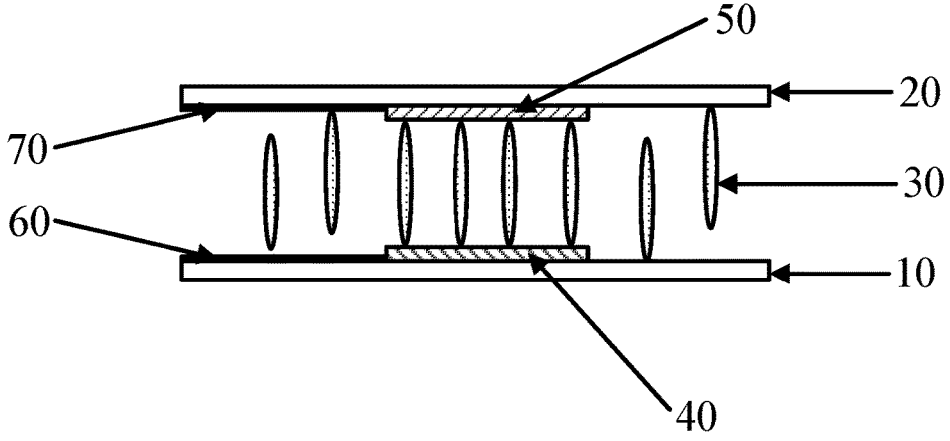
FIG. 3 is a schematic structural diagram of a liquid crystal phase shifter according to an embodiment of the disclosure.

During specific implementation, in the above vehicle-mounted radar system according to an embodiment of the disclosure, as shown in FIGS. 1 and 2, structures of the transmitting phase shifters 21 and structures of the receiving phase shifters 22 may be liquid crystal phase shifters. As shown in FIG. 3, the liquid crystal phase shifter includes: a first substrate 10 and a second substrate 20 arranged oppositely, a liquid crystal layer 30 arranged between the first substrate 10 and the second substrate 20, a first electrode 40 arranged on a side of the first substrate 10 facing the liquid crystal layer 30, a second electrode 50 arranged on a side of the second substrate 20 facing the liquid crystal layer 30, a first driving line 60 arranged on a side of the first substrate 10 facing the liquid crystal layer 30 and electrically connected with the first electrode 40, and a second driving line 70 arranged on a side of the second substrate 20 facing the liquid crystal layer 30 and electrically connected with the second electrode 50. When voltages are applied to the first electrode 40 and the second electrode 50 through the first driving line 60 and the second driving line 70, the liquid crystals in the liquid crystal layer 30 are deflected. The dielectric constant of the liquid crystals changes with the change in degree of deflection, so the electrically adjustable characteristic of the dielectric constant of the liquid crystals in the liquid crystal layer 30 is used to achieve the phase shifting effect of the phase shifter, achieving the phase change of the electromagnetic wave. Therefore, when the driving condition of the vehicle changes, the disclosure changes the phases of the electromagnetic waves through the phase shifters, so that the electromagnetic waves point to the real blind spot in real time.

During specific implementation, as shown in FIG. 3, the first substrate 10 and the second substrate 20 are made of glass to realize the packaging and regulation of the liquid crystal layer 30. The PCB, COP, PI, etc. can also be used as the substrates.

Figure 4:
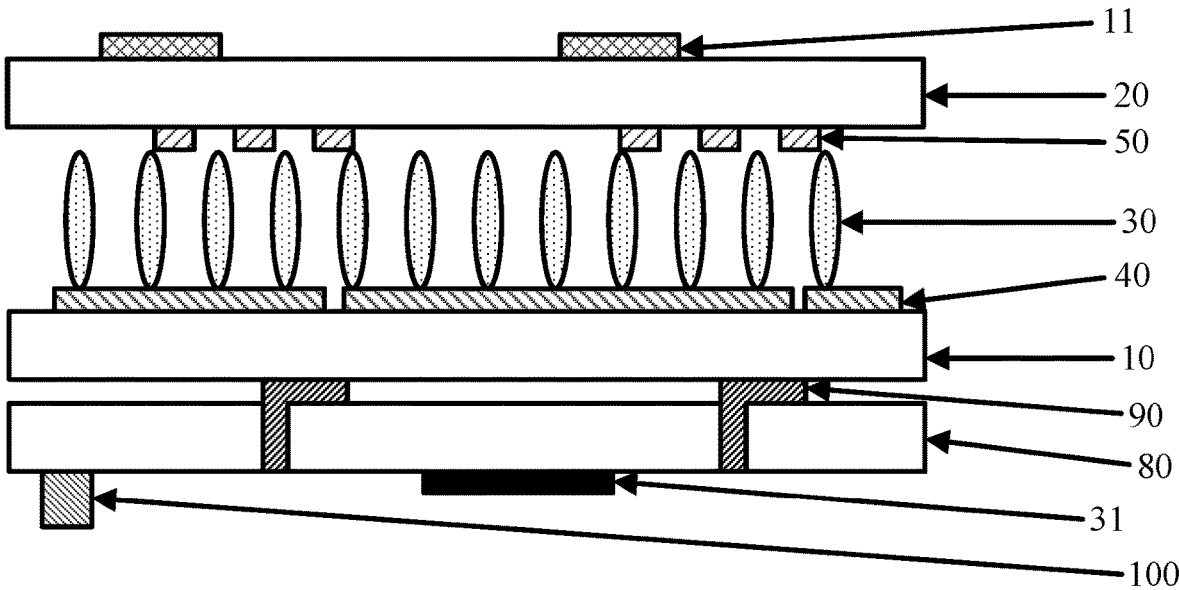
FIG. 4 is a schematic diagram of a stacked structure of a radar chip, a liquid crystal phase shifter and an antenna array according to an embodiment of the disclosure.

During specific implementation, air feed or metal via direct feed may be used between the antenna array 1 and the phase shifter array 2, and between the phase shifter array 2 and the radar chip 31. The stacked structure is shown in FIG. 4. The radar chip 31 feeds the electromagnetic waves to the transmitting phase shifters 21 through coupling feeders 90 penetrating a dielectric substrate 80, and then feeds the electromagnetic waves to the transmitting antennas 11 through coupling. The electromagnetic waves are reflected back (echo signals) after passing through the target, pass through the receiving phase shifters 22, and then are fed to the radar chip 31 through the coupling feeders. The radar chip 31 processes the echo signals to obtain the echo information, and then sends the echo information to the vehicle-machine system from a data interface 100. The vehicle-machine system notifies the alarm system to perform the warning or intervention operation based on the echo information.

Optionally, as shown in FIG. 4, the dielectric substrate 80 may be a low-loss rigid Printed Circuit Board (PCB) or a flexible medium, such as LCP, PI, etc.

Optionally, embodiments of the disclosure take a liquid crystal phase shifter as an example. Of course, the disclosure is not limited thereto. Two-dimensional electronic bandgap phase shifter, resonant ring phase shifter or MEMS phase shifter may also be used to implement the phase shifting function.

Figure 5:
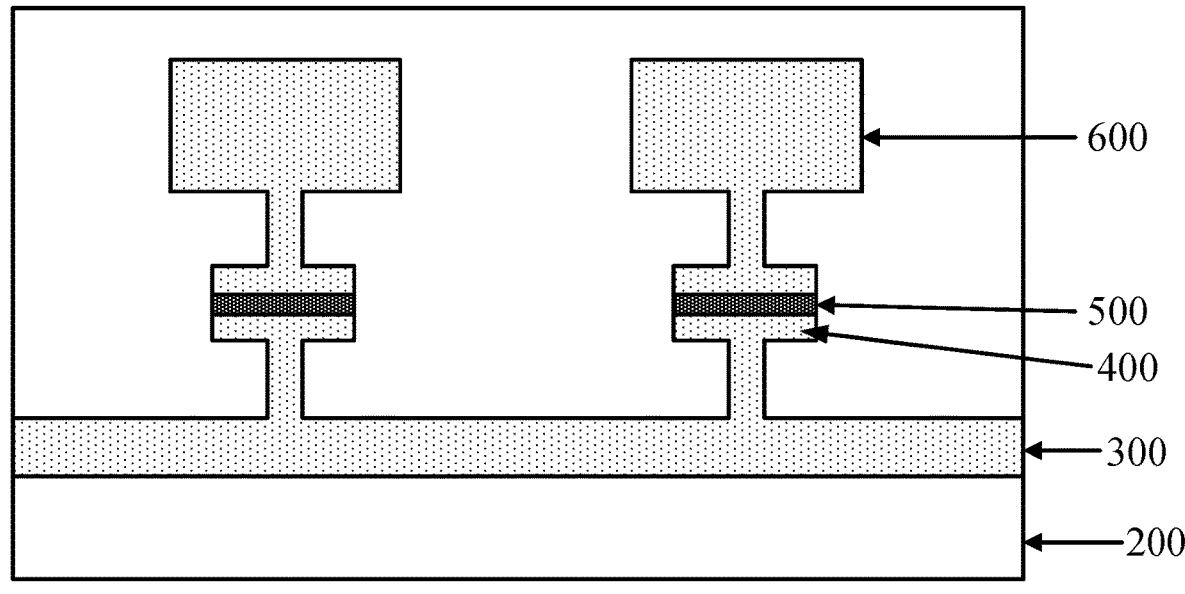
FIG. 5 is a schematic structural diagram of another phase shifter according to an embodiment of the disclosure.

As shown in FIG. 5, FIG. 5 is a two-dimensional electronic bandgap phase shifter, including a substrate 200, and a transmission line 300, a first electrode 400, an electronic bandgap 500 and a second electrode 600 disposed on the substrate 200. The phase shifting is performed by designing a two-dimensional electronic bandgap 500 (equivalent to a period variable capacitance) on the transmission line 300 to perturb the microstructural unit. The principle of phase shifting is: the microwave signal is transmitted as a quasi-TEM wave along the transmission line 300, and the two-dimensional electronic bandgap 500 acts as a variable capacitance structure. When a voltage is applied to the electrodes (400 and 600) on both sides of the electronic bandgap 500, the voltage can cause a change in the quantity of carriers in the electronic bandgap 500, affecting the capacitance and realizing the phase shifting function.

Figure 6:
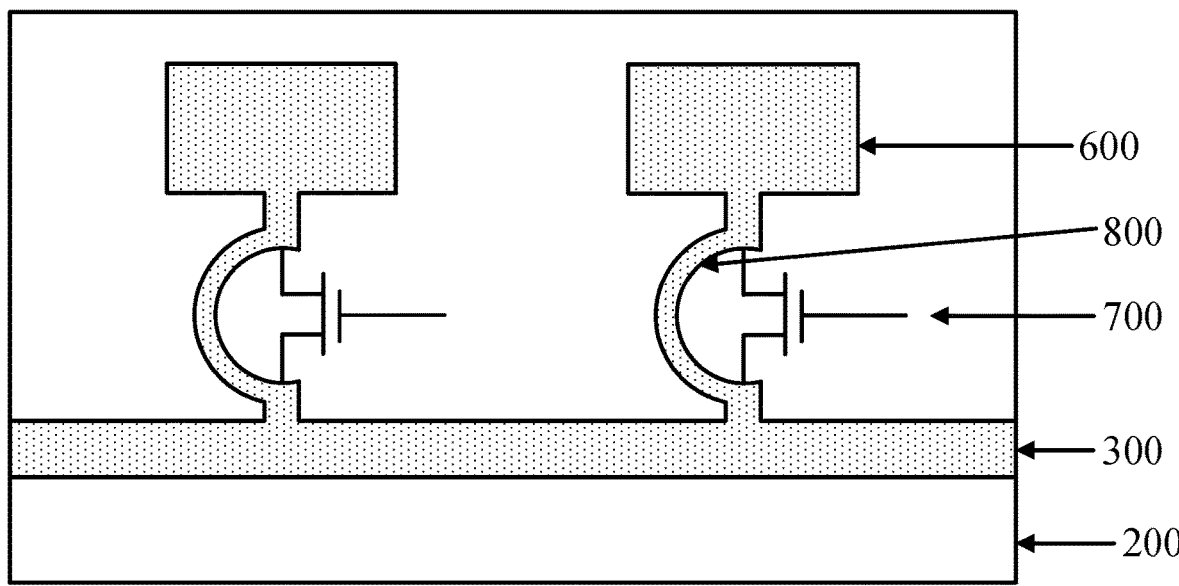
FIG. 6 is a schematic structural diagram of another phase shifter according to an embodiment of the disclosure.

As shown in FIG. 6, FIG. 6 shows a resonant ring phase shifter. The phase shifting is performed by designing a resonant ring structure 800 (equivalent to a period variable inductance) on the transmission line 300. The principle of phase shifting is: the electromagnetic wave signal is transmitted as a quasi-TEM wave along the transmission line 300, and a switching tube 700 is turned on or off to realize the presence or absence of the variable inductance, achieving the effect of the period variable inductance and realizing the phase shifting function.

Figure 7:
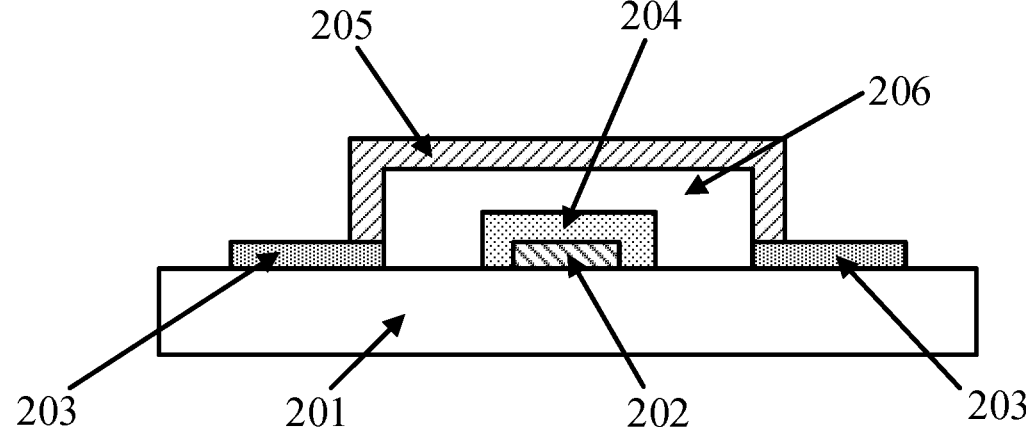
FIG. 7 is a schematic structural diagram of another phase shifter according to an embodiment of the disclosure.

As shown in FIG. 7, FIG. 7 shows an MEMS phase shifter, including: a substrate 201, a coplanar waveguide signal line 202 arranged on the substrate 201, coplanar waveguide ground lines 203 arranged on the substrate 201 and on both sides of the coplanar waveguide signal line 202, an isolation layer 204 arranged on the coplanar waveguide signal line 202 and covering the coplanar waveguide signal line 202, and a metal film bridge 205 electrically connected with the coplanar waveguide ground lines 203 respectively and spanning the coplanar waveguide signal line 202. An air gap 206 is formed between the metal film bridge 205 and the substrate 201. The radio frequency MEMS switch may be used to form a period variable capacitance structure on the coplanar waveguide signal line 202 to perform phase shifting. The specific principle is: changing a height of the metal film bridge 205 by applying a bias voltage between the metal film bridge 205 and the coplanar waveguide signal line 202. When no bias voltage is applied, the metal film bridge 205 remains in the normal state, and there is no phase change when the high-frequency signal passes through the MEMS phase shifter; when the bias voltage is applied, the height of the metal film bridge 205 changes under the electrostatic adsorption of the bias voltage, changing the distributed capacitance of the coplanar waveguide signal line 202, forming the effect that the coplanar waveguide signal line 202 is periodically loaded with a variable capacitance in parallel, and achieving the phase change.

During specific implementation, in the above vehicle-mounted radar system according to an embodiment of the disclosure, the quantity of phase shifters may be equal to the quantity of antennas. As shown in FIG. 2, the transmitting antennas 11 may be connected with the transmitting phase shifters 21 in a one-to-one correspondence, and the receiving antennas 12 may be connected with the receiving phase shifters 22 in a one-to-one correspondence, that is, M and N are the same. Of course, the quantity of phase shifters may also be less than the quantity of antennas. For example, the plurality of transmitting antennas 11 may be connected with the same transmitting phase shifter 21, and the plurality of receiving antennas 12 may be connected with the same receiving phase shifter 22.

Figure 8:
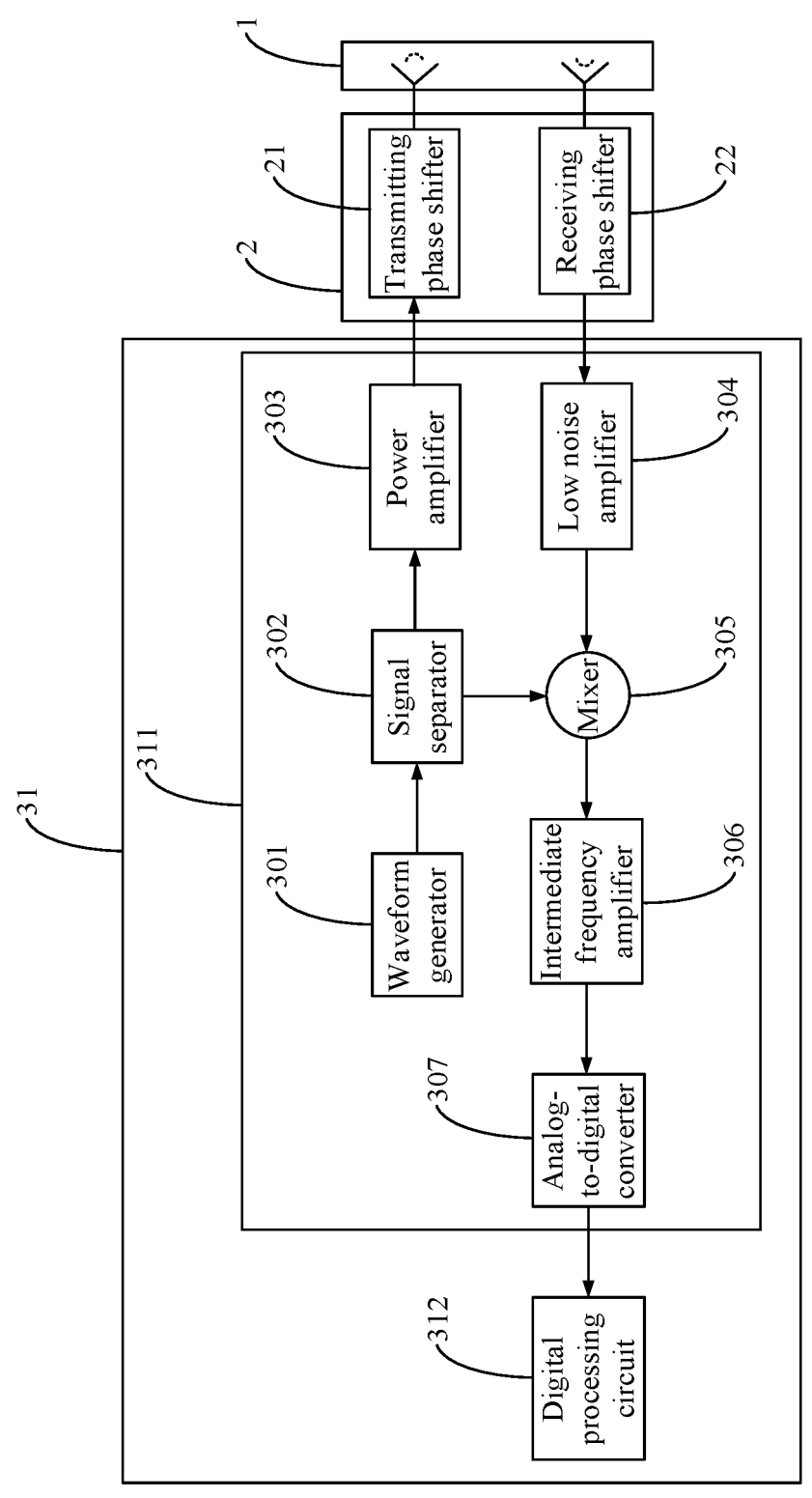
FIG. 8 is a schematic structural diagram of a radar chip according to an embodiment of the disclosure.
Figure 9:
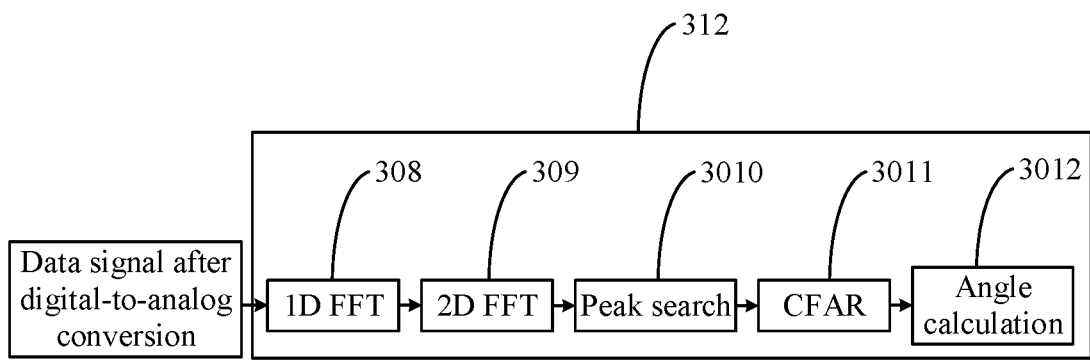
FIG. 9 is a schematic structural diagram of a digital processing circuit according to an embodiment of the disclosure.

During specific implementation, for target monitoring, linear frequency modulation continuous wave signals (such as millimeter-waveband electromagnetic waves) are mainly transmitted by the radar chip. When a signal encounters the target, the signal may be reflected back. According to the frequency difference between transmitting and receiving, the two-way propagation time of the electromagnetic wave can be obtained in combination with the linear frequency modulation slope. Since waves propagate at the speed of light, the relative distance between the panel and the vehicle can be obtained. In the above vehicle-mounted radar system according to an embodiment of the disclosure, as shown in FIGS. 8 and 9, the radar chip 31 includes a microwave circuit 311 and a digital processing circuit 312.

The microwave circuit 311 includes a waveform generator 301, a signal separator 302, a power amplifier 303, a low noise amplifier 304, a mixer 305, an intermediate frequency amplifier 306 and an analog-to-digital converter 307. Here, the waveform generator 301, the signal separator 302 and the power amplifier 303 are connected in sequence; the low noise amplifier 304, the mixer 305, the intermediate frequency amplifier 306, the analog-to-digital converter 307 and the digital processing circuit 312 are connected in sequence. The signal separator 302 is connected with the mixer 305. The waveform generator 301 generates linear frequency-modulated continuous wave signals (electromagnetic waves), and these signals are sent out by the transmitting antennas after the beam directions are adjusted by the phase shifters. When the emitted electromagnetic waves encounter the target, the echo signals are reflected back. The echo signals are received by the receiving antennas, and the received echo signals are converted into the echo information after passing through the low noise amplifier 304, the mixer 305, the intermediate frequency amplifier 306 and the analog-to-digital converter 307.

The digital processing circuit 312 includes one-dimensional Fourier transform 308, two-dimensional Fourier transform 309, peak search 3010, constant false alarm rate 3011 and angle calculation 3012. The digital processing circuit 312 performs 1D FFT 308 (one-dimensional Fourier transform) on the echo information to obtain distance information, and performs 2D FFT 309 (two-dimensional Fourier transform) on the echo information to obtain velocity information; then performs peak search 3010, constant false alarm rate 3011 and angle calculation 3012 in sequence to obtain orientation information; and transmits the distance information, velocity information and orientation information as meta-information to the vehicle-machine system 5. The vehicle-machine system 5 notifies the alarm system to perform the warning or intervention operation based on the distance information, velocity information and orientation information.

Figure 10:
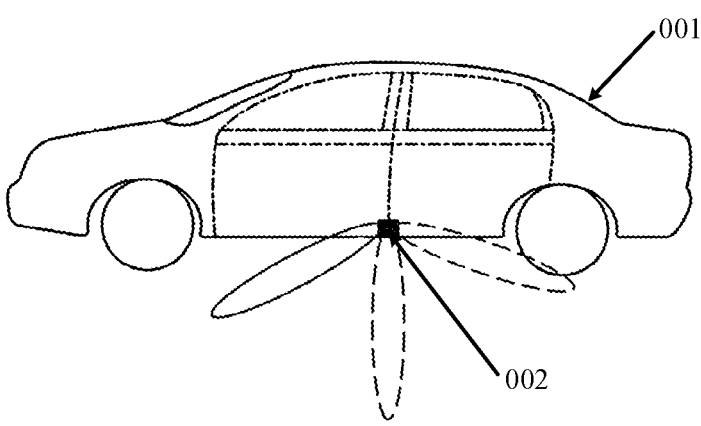
FIG. 10 is a schematic structural diagram of a vehicle according to an embodiment of the disclosure.
Figure 11:
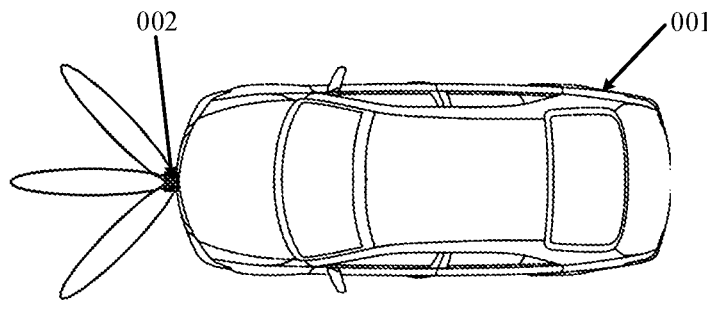
FIG. 11 is a schematic structural diagram of another vehicle according to an embodiment of the disclosure.

Based on the same inventive concept, an embodiment of the disclosure further provides a vehicle, as shown in FIGS. 10 and 11, including a carriage body 001, and the above vehicle-mounted radar system 002 according to embodiments of the disclosure mounted on the carriage body 001. The disclosure can dynamically adjust the radar monitoring area according to the real-time state of the vehicle in cooperation with the vehicle-machine system, truly realizing blind spot monitoring under all vehicle conditions.

During specific implementation, in the above vehicle according to an embodiment of the disclosure, as shown in FIGS. 10 and 11, the vehicle-mounted radar system 002 is mounted at a center position of a front bumper, a center position of a rear bumper, and bottom positions of two B-pillars of the carriage body 001. The vehicle-mounted radar system 002 at the front and rear bumpers can achieve beam control at different angles by adjusting different phase shift amounts of the phase shifters, that is, achieve target monitoring in the front and rear by phase scan time-division multiplexing. The vehicle-mounted radar system 002 at the bottom positions of the B-pillars can monitor side targets and achieve side and diagonal front/rear detections.

During specific implementation, the above vehicle according to an embodiment of the disclosure, as shown in FIGS. 1, 2, 10 and 11, further includes a vehicle-machine system 5, a steering system 6 and an alarm system 7, where the vehicle-machine system 5 is connected with a radar chip 31 and a control chip 32, the steering system 6 is connected with the vehicle-machine system 5, and the alarm system 7 is connected with the vehicle-machine system 5. When detecting the steering angle of the steering system 6, the vehicle-machine system 5 sends the steering angle information to the control chip 32; the control chip 32 controls the phase shifters to adjust the phase shift amounts so that the beams of the electromagnetic waves point to the real blind spot when the vehicle turns, realizing blind spot detection. If a target is detected in the blind spot, the echo signals of the electromagnetic waves reflected by the target are sent to the radar chip 31 after passing through the phase shifters, the radar chip 31 processes the echo signals to obtain the echo information and sends the echo information to the vehicle-machine system 5, and the vehicle-machine system 5 notifies the alarm system 7 to perform the warning or intervention operation based on the echo information.

Based on the same inventive concept, an embodiment of the disclosure further provides a blind spot detection method for a vehicle-mounted radar system, as shown in FIG. 12, including following steps.

S1201: controlling a radar chip to generate an electromagnetic wave.

S1202: controlling a transmitting phase shifter to adjust a beam direction of the electromagnetic wave according to a driving condition of a vehicle.

S1203: controlling a transmitting antenna to transmit the electromagnetic wave with an adjusted beam direction to an actual blind spot.

S1204: controlling a receiving antenna to receive an echo signal reflected by a target and transmit the echo signal to a receiving phase shifter.

S1205: controlling the radar chip to process the received echo signal to obtain echo information and transmit the echo information to a vehicle-machine system.

In the above blind spot detection method for the vehicle-mounted radar system according to an embodiment of the disclosure, the transmitting phase shifter is controlled to adjust the beam direction of the electromagnetic wave according to the driving condition of the vehicle and finally change the beam direction of the electromagnetic wave, so that the electromagnetic wave is emitted to the actual blind spot. This method can monitor the blind spot of the vehicle, and can dynamically adjust the radar monitoring area according to the real-time state of the vehicle in cooperation with the vehicle-machine system, truly realizing blind spot monitoring under all vehicle conditions.

During specific implementation, the above blind spot detection method according to an embodiment of the disclosure, as shown in FIG. 13, further includes following steps.

S1301: the vehicle-machine system determines an expected driving action of the vehicle according to a gear operation of the vehicle in response to a starting process of the vehicle.

S1302: the vehicle-machine system controls the vehicle-mounted radar system to perform detection in a direction of the expected driving action.

S1303: the radar chip transmits the determined echo information to the vehicle-machine system when the radar chip detects a target, and the vehicle-machine system controls an alarm system of the vehicle to alert danger of the target.

S1304: controlling the vehicle-mounted radar system to perform beam control scanning at each steering angle according to a lookup table of steering angles and driving voltages pre-stored in a control chip when the radar chip detects no target.

Figure 14:
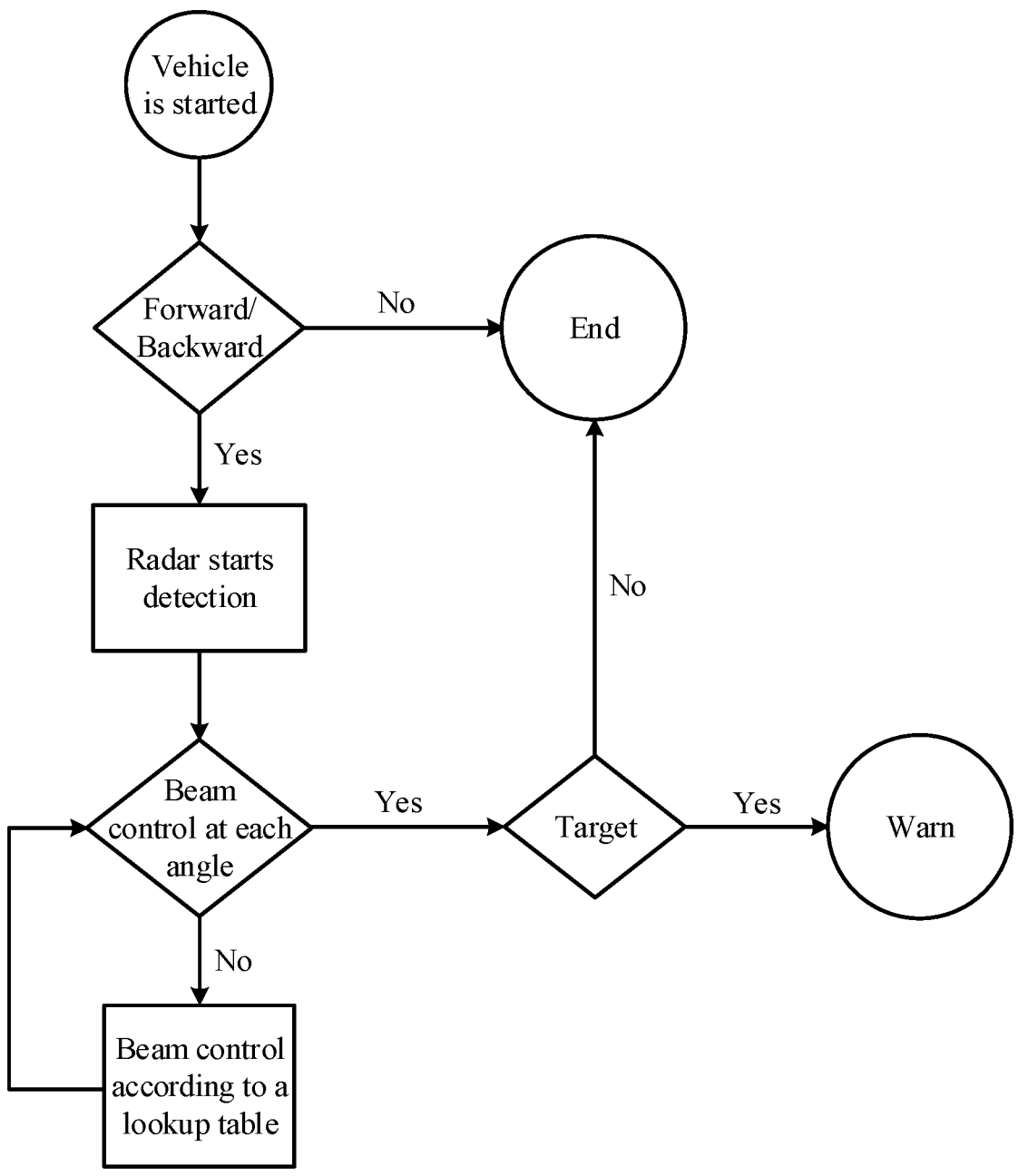
FIG. 14 is a schematic flowchart of the blind spot detection method corresponding to FIG. 13.

As shown in FIG. 14, FIG. 14 is a flowchart of blind spot detection by the vehicle-mounted radar system corresponding to FIG. 13. When the vehicle is in the starting state (the vehicle is started), the vehicle-machine system determines whether to perform a gear operation; if the vehicle-machine system determines not to perform the gear operation, the vehicle radar system does not perform blind spot detection (end); if the vehicle-machine system determines to perform the gear operation, the predicted movement (forward/backward) of the vehicle is obtained, and the vehicle-mounted radar system is activated to perform blind spot detection in a preset direction (forward/backward) (the radar starts detection). If a target (obstacle) is detected, the information may be directly fed back to the vehicle-machine system for warning; if no target is detected in the preset direction, beam control scanning at each angle is performed according to a stored lookup table of steering angles and driving voltages. If a target (obstacle) is detected during scanning, the echo information of the target may be directly fed back to the vehicle-machine system. If the echo information is within the safe range, the blind spot detection ends directly; if the echo information is within the dangerous range, the vehicle-machine system notifies the alarm system to issue a warning. If the beam control at each angle has not been completed, the beam control is continued according to the lookup table, that is, the phase shifter array is driven to control the scanning of beams at all angles, complete all-round monitoring around the carriage body, and ensure startup safety. The current manual confirmation that needs to go around the carriage body can be replaced.

During specific implementation, the above blind spot detection method according to an embodiment of the disclosure, as shown in FIG. 15, further includes following steps.

S1501: the vehicle-machine system determines a current steering angle of the vehicle according to a steering degree of a vehicle steering system in response to a driving process of the vehicle.

S1502: determining a current driving voltage of a transmitting phase shifter corresponding to the current steering angle according to a lookup table of steering angles and driving voltages pre-stored in a control chip.

S1503: driving the transmitting phase shifter to work according to the current driving voltage, so that a beam of the electromagnetic wave output by the radar chip after passing through the transmitting phase shifter points to the actual blind spot corresponding to the current steering angle.

S1504: the radar chip transmits the determined echo information to the vehicle-machine system when the radar chip detects the target in the actual blind spot, and the vehicle-machine system controls an alarm system of the vehicle to alert danger of the target.

Figure 16:
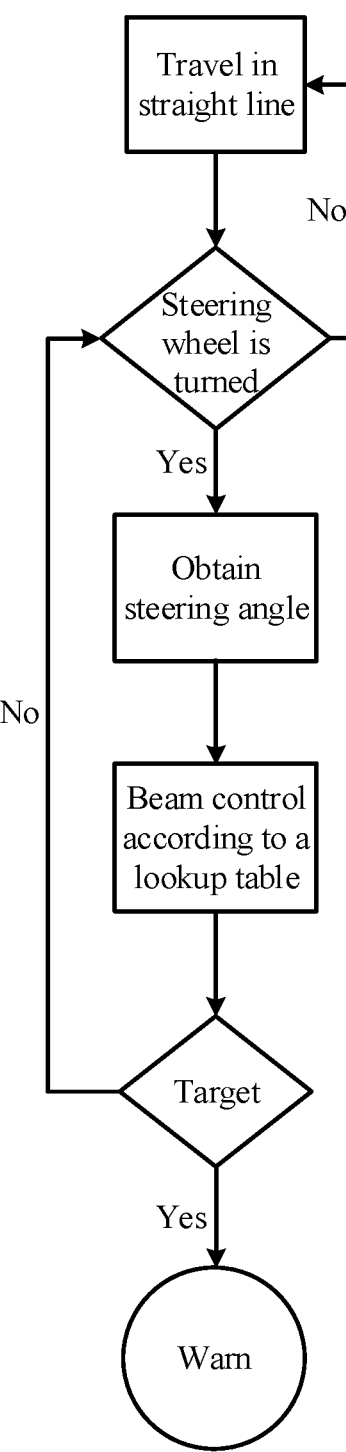
FIG. 16 is a schematic flowchart of the blind spot detection method corresponding to FIG. 15.

As shown in FIG. 16, FIG. 16 is a flowchart of blind spot detection by the vehicle-mounted radar system corresponding to FIG. 15. When the vehicle is traveling in a straight line, the radar system of the disclosure coincides with the traditional directional radar in direction, and mainly monitors the blind spots diagonally ahead and diagonally behind; and determines whether the steering wheel of the vehicle is turned. If the steering wheel of the vehicle is not turned, the vehicle radar system continues detection according to the detection angle when traveling in the straight line; if the steering wheel of the vehicle is turned, the vehicle-machine system determines the current steering angle of the vehicle (obtains the steering angle) according to the degree of steering of the vehicle steering system (turning of the steering wheel), finds the driving voltage corresponding to the current steering angle according to the lookup table, and drives the phase shifter to control the beam direction to point to the corresponding real blind spot during the turning process, to complete the detection of the real blind spot on the side of the carriage body. If the target is detected in the real blind spot (yes), the radar chip transmits the determined echo information to the vehicle-machine system, and the vehicle-machine system controls the alarm system of the vehicle to alert danger of the target. If no target is detected (no), it continues to be determined whether the vehicle's steering wheel is rotated and a series of subsequent operations are performed, to achieve blind spot avoidance.

During specific implementation, in the above blind spot detection method according to an embodiment of the disclosure, as shown in FIG. 17, the lookup table of steering angles and driving voltages is obtained by following steps.

S1701: dividing a plurality of steering angles of the vehicle according to a quantity of turns of the steering system.

A beam width of the radar signal is about 30°, so the beam positions corresponding to 4 to 5 steering angles can achieve detection of one surface. For example, when the steering system rotates half a turn, the steering angle of the vehicle is 30 degrees, and then 0-30 degrees corresponds to one blind spot. For example, when the steering system rotates a turn, the steering angle of the vehicle is 60 degrees, and then 30-60 degrees corresponds to one blind spot. For example, when the steering system rotates 1.5 turns, the steering angle of the vehicle is 90 degrees, and then 60-90 degrees corresponds to one blind spot; and so on.

S1702: determining an actual blind spot corresponding to each steering angle.

Actual blind spots corresponding to the steering angles of 0-30 degrees, 30-60 degrees, 60-90 degrees, etc. are determined.

S1703: determining a beam direction of the electromagnetic wave corresponding to each actual blind spot.

Beam directions of the electromagnetic waves corresponding to the actual blind spots when the steering angles are respectively 0-30 degrees, 30-60 degrees, 60-90 degrees, etc. are determined.

S1704: determining a phase shift amount of the transmitting phase shifter according to the beam direction.

Phase shift amounts of the transmitting phase shifters corresponding to the steering angles of 0-30 degrees, 30-60 degrees, 60-90 degrees, etc. are determined.

S1705: determining a driving voltage of the transmitting phase shifter according to the phase shift amount, to obtain a driving voltage lookup table corresponding to each steering angle.

Driving voltages of the transmitting phase shifters corresponding to the steering angles of 0-30 degrees, 30-60 degrees, 60-90 degrees, etc. are determined, to obtain the driving voltage lookup tables corresponding to the steering angles of 0-30 degrees, 30-60 degrees, 60-90 degrees, etc.

During specific implementation, in the above blind spot detection method according to an embodiment of the disclosure, the echo information may include a distance, a relative speed and orientation information between the target and the vehicle. The calculation method of the echo information can be referred to the description in the above vehicle-mounted radar system, and will not be described in detail here.

During specific implementation, the above blind spot detection method according to an embodiment of the disclosure further includes: controlling the vehicle-mounted radar system mounted at a center position of a front bumper and a center position of a rear bumper to start detection of the actual blind spot and determine whether there is a target in the actual blind spot in response to a straight-line driving process of the vehicle. When the vehicle is always traveling in a straight line, the same beam direction of the radar is set in the conventional blind spot (diagonally ahead, diagonally behind) that the driver cannot see.

The method of blind spot detection performed by four vehicle-mounted radar systems on a vehicle when the vehicle turns according to an embodiment of the disclosure will be illustrated below.

Figure 18:
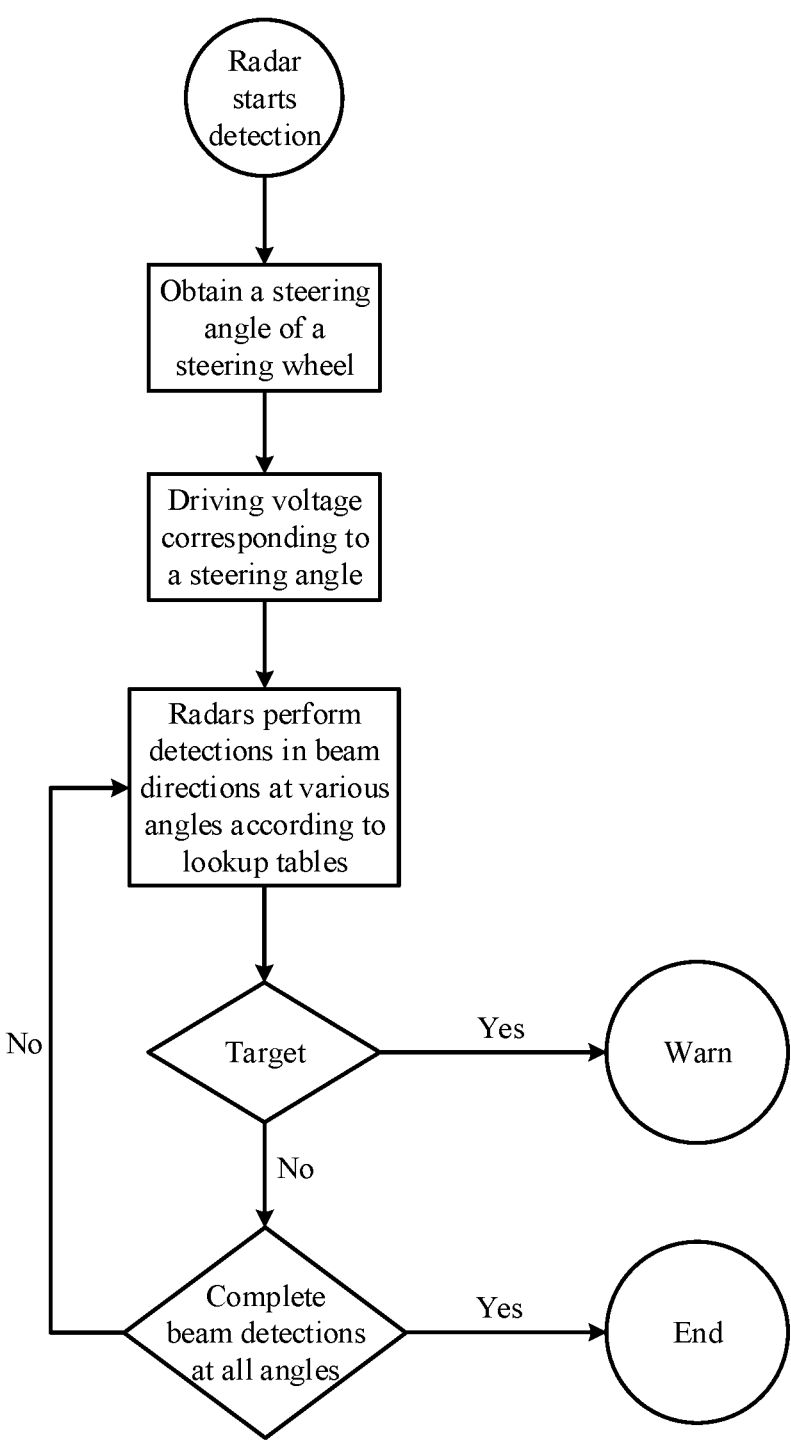
FIG. 18 is a schematic flowchart of performing blind spot detection by four vehicle-mounted radar systems on a vehicle when the vehicle turns according to an embodiment of the disclosure.

As shown in FIG. 18, the radar system starts detection; and the vehicle-machine system obtains the steering angle of the steering wheel according to the degree of steering of the vehicle steering system, and finds the driving voltage corresponding to the phase shifter in each radar system corresponding to the current steering angle according to the lookup table (the driving voltage corresponding to the steering angle*M). The plurality of radar systems perform detections in beam directions at various angles according to the respective lookup tables, and control the beam directions to point to the corresponding real blind spot during the turning process, to complete the detection of the real blind spot on the side of the carriage body. It is determined whether a target is detected in the blind spot, if the target is detected in the blind spot, the corresponding warning operation is performed; if the target is not detected in the blind spot, it is determined whether beam detections of all radar systems at all angles have been completed. If the beam detections of all radar systems at all angles have not been completed, the plurality of radar systems continue the detections in beam directions at various angles according to the respective lookup tables; if the beam detections of all radar systems at all angles have been completed, the detections in beam directions at various angles are ended.

Embodiments of the disclosure provide a vehicle-mounted radar system, a blind spot detection method and a vehicle. The phase shifter array is added between the antenna array and the data processing unit. When the driving condition of the vehicle changes to cause a change in the blind spot position, the beam direction of the electromagnetic waves can be ultimately changed by adjusting the phase shift amount of the phase shifter array, so that the electromagnetic waves are emitted to the actual blind spot. If the target (obstacle) is detected in the actual blind spot, the electromagnetic waves may be emitted and reflected back by the target, obtained by the receiving antennas and processed by the radar chip, and the echo information may be fed back to the vehicle-machine system for the warning or intervention operation. Therefore, the disclosure can monitor the blind spot of the vehicle, and can dynamically adjust the radar monitoring area according to the real-time state of the vehicle in cooperation with the vehicle-machine system, truly realizing blind spot monitoring under all vehicle conditions.

Evidently those skilled in the art can make various modifications and variations to the disclosure without departing from the spirit and scope of the disclosure. Thus the disclosure is also intended to encompass these modifications and variations to the disclosure as long as these modifications and variations come into the scope of the claims of the disclosure and their equivalents.

What is claimed is:
1. A vehicle-mounted radar system, comprising:
an antenna array comprising a plurality of transmitting antennas and a plurality of receiving antennas, wherein the transmitting antennas are configured to transmit electromagnetic waves, the receiving antennas are configured to receive echo signals, and the echo signals are signals of the electromagnetic waves reflected back from a target;
a phase shifter array comprising a plurality of transmitting phase shifters and a plurality of receiving phase shifters, wherein the transmitting phase shifters are connected with corresponding transmitting antennas, the receiving phase shifters are connected with corresponding receiving antennas, the transmitting phase shifters are configured to adjust a beam direction of the electromagnetic waves according to a driving condition of a vehicle so that the electromagnetic waves are transmitted to an actual blind spot, and the receiving phase shifters are configured to adjust a beam direction of the echo signals so that the beam direction of the echo signals is same as the beam direction of the electromagnetic waves; and a data processing unit comprising a radar chip, wherein the radar chip is connected with the transmitting phase shifters and the receiving phase shifters respectively, and the radar chip is configured to generate the electromagnetic waves, process the received echo signals to obtain echo information, and transmit the echo information to a vehicle-machine system;

wherein the radar chip comprises a microwave circuit and a digital processing circuit; wherein:

the microwave circuit comprises a waveform generator, a signal separator, a power amplifier, a low noise amplifier, a mixer, an intermediate frequency amplifier and an analog-to-digital converter, wherein the waveform generator, the signal separator and the power amplifier are connected in sequence; the low noise amplifier, the mixer, the intermediate frequency amplifier, the analog-to-digital converter and the digital processing circuit are connected in sequence; and the signal separator is connected with the mixer; and the digital processing circuit comprises one-dimensional Fourier transform, two-dimensional Fourier transform, peak search, constant false alarm rate and angle calculation.

2. The vehicle-mounted radar system according to claim 1, wherein the data processing unit further comprises a control chip, the control chip is connected with the transmitting phase shifters and the receiving phase shifters respectively, and the control chip is configured to adjust phase shift amounts of the transmitting phase shifters and the receiving phase shifters according to the driving condition of the vehicle obtained from the vehicle-machine system.

3. The vehicle-mounted radar system according to claim 1, wherein structures of the transmitting phase shifters and structures of the receiving phase shifters are liquid crystal phase shifters, two-dimensional electronic bandgap phase shifters, resonant ring phase shifters or MEMS phase shifters.

4. The vehicle-mounted radar system according to claim 1, wherein the transmitting antennas are connected with the transmitting phase shifters in a one-to-one correspondence, and the receiving antennas are connected with the receiving phase shifters in a one-to-one correspondence.

5. The vehicle-mounted radar system according to claim 1, wherein the plurality of transmitting antennas are connected with a same transmitting phase shifter, and the plurality of receiving antennas are connected with a same receiving phase shifter.

6. A vehicle, comprising a carriage body, and the vehicle-mounted radar system of claim 1 mounted on the carriage body.

7. The vehicle according to claim 6, wherein the vehicle-mounted radar system is mounted at a center position of a front bumper, a center position of a rear bumper, and bottom positions of two B-pillars of the carriage body.

8. The vehicle according to claim 6, further comprising a vehicle-machine system, a steering system and an alarm system, wherein the vehicle-machine system is connected with a radar chip and a control chip, the steering system is connected with the vehicle-machine system, and the alarm system is connected with the vehicle-machine system.

9. A blind spot detection method for a vehicle-mounted radar system, comprising:

controlling a radar chip to generate an electromagnetic wave;

controlling a transmitting phase shifter to adjust a beam direction of the electromagnetic wave according to a driving condition of a vehicle;

controlling a transmitting antenna to transmit the electromagnetic wave with an adjusted beam direction to an actual blind spot;

controlling a receiving antenna to receive an echo signal reflected by a target and transmit the echo signal to a receiving phase shifter; and controlling the radar chip to process the received echo signal to obtain echo information and transmit the echo information to a vehicle-machine system;

wherein the method further comprises:

determining, by the vehicle-machine system, a current steering angle of the vehicle according to a steering degree of a vehicle steering system in response to a driving process of the vehicle;

determining a current driving voltage of the transmitting phase shifter corresponding to the current steering angle according to a lookup table of steering angles and driving voltages pre-stored in a control chip;

driving the transmitting phase shifter to work according to the current driving voltage, so that a beam of the electromagnetic wave output by the radar chip after passing through the transmitting phase shifter points to the actual blind spot corresponding to the current steering angle; and transmitting, by the radar chip, the determined echo information to the vehicle-machine system when the radar chip detects the target in the actual blind spot; and controlling, by the vehicle-machine system, an alarm system of the vehicle to alert danger of the target.

10. The blind spot detection method according to claim 9, further comprising:

determining, by the vehicle-machine system, an expected driving action of the vehicle according to a gear operation of the vehicle in response to a starting process of the vehicle;

controlling, by the vehicle-machine system, the vehicle-mounted radar system to perform detection in a direction of the expected driving action;

transmitting, by the radar chip, the determined echo information to the vehicle-machine system when the radar chip detects the target; and controlling, by the vehicle-machine system, an alarm system of the vehicle to alert danger of the target; and controlling the vehicle-mounted radar system to perform beam control scanning at each steering angle according to a lookup table of steering angles and driving voltages pre-stored in a control chip when the radar chip detects no target.

11. The blind spot detection method according to claim 9, wherein the lookup table of steering angles and driving voltages is obtained by:

dividing a plurality of steering angles of the vehicle according to a quantity of turns of the steering system;

determining an actual blind spot corresponding to each steering angle;

determining a beam direction of the electromagnetic wave corresponding to each actual blind spot;

determining a phase shift amount of the transmitting phase shifter according to the beam direction; and determining a driving voltage of the transmitting phase shifter according to the phase shift amount, to obtain a driving voltage lookup table corresponding to each steering angle.

12. The blind spot detection method according to claim 9, wherein the echo information comprises a distance, a relative speed and orientation information between the target and the vehicle.

13. The blind spot detection method according to claim 9, further comprising: controlling the vehicle-mounted radar system mounted at a center position of a front bumper and a center position of a rear bumper to start detection of the actual blind spot and determine whether there is a target in the actual blind spot in response to a straight-line driving process of the vehicle.

* * * * *